United States Patent [19]

Wolfe et al.

[11] Patent Number: 4,595,508

[45] Date of Patent: Jun. 17, 1986

[54] REDUCTION OF SODIUM/AMMONIUM ALKALINITY IN INDUSTRIAL WASTEWATER

[75] Inventors: Edward I. Wolfe; David H. Wasserstrom, both of Whippany; Richard Kilpert, Berkeley Heights, all of N.J.

[73] Assignee: Exxon Research and Engineering Co., Florham Park, N.J.

[21] Appl. No.: 607,664

[22] Filed: May 7, 1984

[51] Int. Cl.$^4$ .................................................. C02F 1/42
[52] U.S. Cl. ...................................... 210/631; 210/669; 210/681
[58] Field of Search ........................ 210/631, 669, 681

[56] References Cited

U.S. PATENT DOCUMENTS

| | | |
|---|---|---|
| 2,609,341 | 9/1952 | Juda . |
| 3,095,265 | 11/1958 | Effer . |
| 3,382,034 | 5/1968 | Kraus . |
| 3,475,330 | 10/1969 | Gilles . |
| 3,501,402 | 3/1970 | Console .............................. 210/681 |
| 3,928,192 | 12/1975 | Katzakian . |
| 4,083,782 | 4/1978 | Kunin . |
| 4,098,690 | 7/1978 | Semmens . |
| 4,349,442 | 9/1982 | Barraque . |
| 4,370,234 | 1/1983 | Marsland . |

FOREIGN PATENT DOCUMENTS

| | | |
|---|---|---|
| 3101845 | 1/1977 | Japan . |
| 56053 | 10/1979 | Japan . |
| 944634 | 1/1981 | U.S.S.R. . |

OTHER PUBLICATIONS

*Dow Chemical Cation Resin Product Brochure*, vol. 2, No. 3.
*Diamond Shamrock Product Brochure* for Weak Cation Exchange Resins in Water Treatment.
*Rohm and Haas Technical Bulletin* for Amberlite IR-C-84.

*Primary Examiner*—Ivars Cintins
*Attorney, Agent, or Firm*—Robert J. North; Edward H. Mazer

[57] ABSTRACT

Industrial wastewater is contacted with a weak acid cation exchange resin, in the hydrogen ion form, to substantially reduce the sodium and ammonium alkalinity levels rendering the wastewater suitable, for example, as an environmentally acceptable cooling medium.

9 Claims, No Drawings

REDUCTION OF SODIUM/AMMONIUM ALKALINITY IN INDUSTRIAL WASTEWATER

BACKGROUND OF THE INVENTION

1. Field of the Invention

This invention relates to the use of a weak acid cation exchange resin in reducing the sodium/ammonium alkalinity of industrial/municipal wastewater.

2. Brief Description of Disclosures In The Art

There is currently a growing need to operate with zero discharge wastewater in many large scale industrial processes located in arid regions, such as the Southwest, and in areas where federal and state regulatory schemes are uncertain regarding amounts and quality of generated process wastewater. By the term "zero discharge" is meant that generated wastewater in a process is not discharged, but treated to reduce/remove pollutants and then recycled back into the process for a variety of uses, such as process makeup cooling water, i.e., supplemental cooling water to replace that lost by evaporation.

Wastewater reduction schemes are particularly necessary in large scale hydrocarbon conversion processes, such as coal liquefaction, i.e., Exxon Donor Solvent TM coal liquefaction process. Wastewater in a typical coal liquefaction process contains copious amounts of dissolved organic materials such as phenols, organic acids, organic nitrogen compounds, ketones, aldehydes and dissolved ammonia. This wastewater effluent can be initially treated with means to remove hydrogen sulfides, volatile and steam-distillable organics and a large portion of the ammonia. Caustic can then be added to produce free ammonia and a portion of this residual ammonia can be further removed by steam. The phenolics can then be extracted by suitable processes. Following extraction of phenolics, the wastewater can be biologically treated with microorganisms ("biox-treated") to degrade dissolved organics, while also removing nutrient salts, such as ammonia and other nitrogen compounds. Following the biological treatment, the treated wastewater is filtered to remove particulate matter not susceptible to removal by biological treatment.

Following filtration, the treated wastewater can optionally be treated with activated carbon to remove non-degradable organic compounds by adsorption.

At this point, the biologically treated wastewater contains a high amount of sodium alkalinity, a high total alkalinity and relatively low ammonia alkalinity. To be classified a makeup cooling water, the total alkalinity and sodium alkalinity must be substantially decreased to avoid corrosion to the downstream carbon steel equipment. Further, the residual ammonium alkalinity must be further minimized since the wastewater has to be chlorinated prior to recycle to avoid undesirable sludge formation. Each unit weight of ammonium requires about 10 unit weight chlorine to adequately control biological growth in recirculated cooling water and excessive amounts of residual ammonia can lead to excessive costs in the chlorination step.

Strong acid Cation resin exchange procedures are known in the art for reducing total alkalinity, sodium alkalinity, and ammonium alkalinity. However, the use of a strong cation exchange resin would unnecessarily add to the cost of any process based thereon, since strong mineral acid would be generated in the cation exchange scheme necessitating a further downstream neutralization step.

Weak acid and cation ion exchange resins are know to be effective for removing individually sodium or ammonium alkalinity from wastewater by exchange with hydrogen ion.

For example, U.S. Pat. No. 3,475,330 discloses removing ammonia ions from steam condensates by passing the water through a weak acid ion exchange resin.

U.S. Pat. No. 3,928,192 discloses removing water soluble inorganic salts from water by treatment with a combination of weak basic anionic exchange columns, and ammonium-buffered weak cation exchange resins.

U.S. Pat. No. 4,083,782 discloses removing the hardness from water by passing the water through a weak cation exchange resin in the alkali metal or ammonium form.

U.S. Pat. No. 4,349,442 discloses individually removing ammonium and sodium ions from water by passing the water through a cation exchange resin and then through a bed of mixed anion and cation exchange resins.

U.S. Pat. No. 4,370,234 discloses passing wastewater through a biological filter and then ion exchanging the water with a cation exchange resin containing nitrifying bacteria.

Further disclosures in the art include Japanese Pat. Nos. J53101-845 and J56053-743; Russian Pat. SU No. 944-634; U.S. Pat. No. 4,098,690; and U.S. Pat. No. 3,095,265.

As is seen, removing ammonium ions and sodium ions individually by ion exchange procedures utilizing a weak acid cation exchange resin is disclosed by the above-cited disclosures. However, what is desired is a process for simultaneously reducing the concentrations of both ions on the same weak cation exchange resin from industrial/municipal wastewater containing high total alkalinity and sodium alkalinity and relatively low ammonium alkalinity. Thus, alkalinity and ion levels could be obtained sufficient to enable the use of said wastewater after effective chlorination for use, as for example, makeup cooling water, in an industrial process, which does not exhibit significant corrosion or sludge buildup.

SUMMARY OF THE INVENTION

It has been found that industrial wastewater containing a high total alkalinity, high sodium alkalinity and relatively low ammonium alkalinity and having a hardness/alkalinity ratio less than 1.0, can be treated by an ion exchange procedure in which the total alkalinity, sodium alkalinity and ammonium alkalinity can be reduced to levels suitable for use as recycle makeup cooling water. The wastewater, preferably following biological treatment, filtration and treatment with activated carbon, is eluted through a weak acid ion exhange resin, in hydrogen ion form, resulting in substantial reduction, preferably of about 70% of dissolved sodium ion and about 80% of dissolved ammonium ion. Substantial reductions in total alkalinity are also obtained.

In accordance with this invention, there is provided a process for reducing sodium and ammonium alkalinity of wastewater, comprising the step of contacting said wastewater possessing a high sodium alkalinity, relatively low ammonium alkalinity, and a hardness/alkalinity ratio less than 1.0, with a weak acid cation exchange resin, in hydrogen ion form, and continuing said contacting for a time sufficient to substantially reduce said sodium alkalinity and said ammonium alkalinity.

DESCRIPTION OF THE INVENTION AND PREFERRED EMBODIMENTS

The wastewater applicable in the instant invention can be any industrial process or municipal wastewater which can be also biologically treated to reduce soluble organics, filtered to remove insolubles, and treated with activated carbon to further reduce the organics concentration. Particularly preferred for treatment by this process is wastewater from hydrocarbon conversion processes, particularly coal liquefaction process which generate considerable ammonia-containing wastewater.

The wastewater, particularly from a coal liquefaction process can contain the following dissolved salts: calcium chloride, magnesium chloride, sodium sulfide, sodium sulfate, sodium nitrate, sodium chloride, sodium bicarbonate and ammonium salts and the like. Also dissolved are simple and complex organic compounds such as sulfides, ethers, ketones, aldehydes, acids, organic nitrogen compounds and the like.

In general, the above-described wastewater can contain:
10 to 2000 mg/l (as $CaCO_3$) total alkalinity;
10 to 2000 mg/l (as $CaCO_3$) sodium alkalinity, and
10 to 1000 mg/l (as $CaCO_3$) ammonium alkalinity.

The weak acid cation exchange resin functions in the instant process by exchanging a hydrogen ion for cations associated with bicarbonate anions. Generally, the resin is reacting with the bicarbonate salts of calcium, magnesium, ammonium and sodium, in which carbonic acid is formed which can decompose to $CO_2$ and water. Cations associated with other anions, e.g., chloride, sulfate, will only undergo exchange to a very small degree. Thus, the term "total alkalinity" refers to the total amount of cation associated with bicarbonate ion, and is expressed by the conventional units, mg./l (or ppm) as $CaCO_3$, i.e., the number of equivalents times the equivalent weight of $CaCO_3$. The total alkalinity is generally determined by standard methyl orange titration.

Similarly, "sodium alkalinity" and "ammonium alkalinity" refer to the amounts of sodium ion and ammonium ion associated with bicarbonate, expressed as mg/l of $CaCO_3$. The above-described ranges for sodium and ammonium alkalinity are representative of "high" and "low" as respectively used herein. Further, the sodium alkalinity/ammonia alkalinity ratio of said wastewater is generally greater than one.

After treatment with the weak acid cation resin the resulting effluent will generally contain the following ranges of sodium, ammonium and total alkalinity:
0 to 200 mg/l (as $CaCO_3$) of sodium alkalinity;
0 to 100 mg/l (as $CaCO_3$) of ammonium alkalinity, and
0 to 200 mg/l (as $CaCO_3$) of total alkalinity.

The effluent elution is usually stopped when the desired value of the total alkalinity of the effluent is reached, being within the above-described range. The above obtained values of effluent generally represent; about 70% and greater reduction in sodium ion expressed as sodium alkalinity; about 80% and greater reduction in ammonium ion expressed as ammonium alkalinity; and about 70% reduction in total alkalinity of an industrial wastewater from a hydroconversion process.

Preferably, the resulting effluent has 3 mg/l (as $CaCO_3$) or less of ammonium ion and 10 mg/l or less (as $CaCO_3$) of total alkalinity including sodium alkalinity. Particularly preferred is where the sum of resulting effluent sodium and ammonium alkalinity is about 10 mg/l or less as $CaCO_3$. The pH of the resulting effluent is generally in the range of 4.3 to 7.0, and that of the influent is generally in the range of above 4.3.

In general, the hardness/alkalinity ratio of the influent is less than 1.0 to allow the removal of sodium and ammonium ions associated with bicarbonate anion, and the hardness/alkalinity ratio for the resulting effluent is generally less than 0.01. The resulting effluent is passed to chlorination step to eliminate sludge formation in recycling cooling water.

Generally, the wastewater contains a substantial amount of dissolved solids. Preferred, is where the resulting solids are about 1000 ppm or less in the effluent after the weak acid ion exchange step in the process, prior to chlorination.

The weak acid cation exchange resin applicable in the process is conventional and must be substantially in the hydrogen ion form for use in the process. Preferably, the weak acid functionality is carboxylic acid, and the polymer matrix preferably being polyacrylic acid, polymethacrylic acid, preferably being crosslinked with divinylbenzene. The resin can be gelular or macroporous, i.e. macroreticular. Representative examples of conventionally available weak acid resins for this purpose are: Amberlite IRC-84 (Rohm & Haas), Dowex CCR-2 (Dow Chemical), Duolite C-433 and C-464 (Diamond Shamrock), Ionac CNN (SYBRON), Dowex MWC-1 (Dow Chemical), Amberlite DP-1 and INC-50 (Rohm & Haas), Ionac CC (SYBRON) and Lewatit CNP-80 (Bayer). Preferred is a polyacrylic acid-divinylbenzene copolymer resin such as Amberlite IRC-84. The weak acid resins are prepared for use in the process by conventional technology by treating a bed of the resin in distilled water with strong acid, i.e., HCl or $H_2SO_4$ and then eluting until neutral elutions are obtained.

Apparatus for conducting the weak cation ion exchange step of the instant process is conventional in the art.

The flow rate of the influent through the cation resin bed is generally a function of the design of the column, height, diameter, amount of resin and the like. Preferably a flow of 1 to 12 gpm/ft$^2$ per cross sectional area of vessel gives effective results.

The temperature of the process is usually conducted at ambient temperature and the pressure is usually about atmospheric to about 155 psig pressure. Preferably, the pressure is in the range of about 50–150 psig.

The capacity of the column, i.e., the amount of wastewater in gallons/per weight of resin/per regeneration, is determined by conventional techniques and is usually calculated on the basis of the point where 10% of the influent alkalinity is required through the elution cycle.

The process can be conducted such that when the end point in one column is reached, the influent is transferred to another fresh ready column in parallel. A series arrangement of the columns can also be utilized. The process can be conducted either in a batch manner or continuous manner.

Regeneration of the weak acid ion exchange column after use is accomplished by conventional techniques or by elution with strong acid, followed by washing with water.

In practice, a preferred mode of operating include passing one stream of effluent through the weak acid cation exchange resin to achieve a slight free mineral acidity of about 10–20 mg/l as $CaCO_3$. Another stream is passed to provide a slight total alkalinity (methyl orange) of about 20–30 mg/l as $CaCO_3$. The streams are then mixed to provide a final treated wastewater of about 10 mg/l or less total alkalinity and 3 mg/l less or $CaCO_3$ of ammonium alkalinity, and then sent to chlorination.

Modifications and variations of the process, as described herein, will be obvious to one skilled in the art in obtaining substantially the same results.

The following examples are illustrative modes of carrying out the instant invention as contemplated by us and should not be construed as being limits on the scope or spirit of the instant invention.

EXAMPLE

Preparation of Simulated Coal Gas Effluent

A simulated coal gas liquor containing all the ionic species for the test samples, was prepared in two 150 gallon capacity sample tanks. The simulated effluent contained all of the inorganic and ionic species which would normally be present but did not contain dissolved organic species. The concentrated solution was prepared in 150 liter batches with the following salt concentrations:

TABLE I

| Constituent | Concentration (mg/l) | Ionic Species (mg/l $CaCO_3$) | | | | | | |
|---|---|---|---|---|---|---|---|---|
| | | $Ca^{++}$ | $Mg^{++}$ | $Na^{++}$ | $HCO_3^-$ | $SO_4^{--}$ | $Cl_1^-$ | $NO_3^-$ |
| $CaCl_2$ | 222 | 200 | — | — | — | — | 200 | — |
| $MgCl_2$ | 190 | — | 200 | — | — | — | 200 | — |
| $Na_2SO_4$ | 53,300 | — | — | 37,310 | — | 37,310 | — | — |
| $NaNO_3$ | 1,360 | — | — | 800 | — | — | — | 800 |
| NaCl | 1,290 | — | — | 1,100 | — | — | 1,100 | — |
| $NaHCO_3$ | 128,000 | — | — | 76,800 | 76,800 | — | — | — |
| Total | 184,362 | 200 | 200 | 116,010 | 76,800 | 37,310 | 1,500 | 800 |

An impeller mixer was used to keep the solution equalized while measured amounts were withdrawn for preparation of test samples by mixing with ammonium bicarbonate.

Test samples were made to the following specifications:

TABLE II

| | Test Sample Specifications | | | | | |
|---|---|---|---|---|---|---|
| | Test # | | | | | |
| | 1 | 2 | 3 | 4 | 5 | 6 |
| Cations (mg/l as $CaCO_3$) | | | | | | |
| $Ca^{++}$ | 2 | 2 | 2 | 2 | 2 | 2 |
| $Mg^{++}$ | 2 | 2 | 2 | 2 | 2 | 2 |
| $Na^+$ | 1156 | 1156 | 1156 | 1156 | 1156 | 1156 |
| $NH_4^+$ | 18 | 147 | 294 | 294 | 294 | 294 |
| Anions (mg/l as $CaCO_3$) | | | | | | |
| $HCO_3^-$ | 780 | 909 | 1056 | 1056 | 1056 | 1056 |
| $SO_4^{--}$ | 375 | 375 | 375 | 375 | 375 | 375 |
| $Cl^-$ | 15 | 15 | 15 | 15 | 15 | 15 |
| $NO_3^-$ | 8 | 8 | 8 | 8 | 8 | 8 |

Column Testing Procedure

Two 4" internal diameter columns, 6' and 10' in length, were used for all testing. Prior to initial use, the resin, Amberlite TM IRC-84, Lot #8073, (Rohm & Haas) was loaded into the column and put through the normal pre-run cycle, including backwash, regeneration and rinsing. Deionized water was used for all rinsing, backwashing and dilution to minimize the effect on the capacity calculations.

The simulated wastewater, prepared in or described above 150 gallon sample tanks, was diluted and mixed with concentrated solution and appropriate amounts of ammonium bicarbonate. The resulting solution was prepared by running the feed pump on recycle for about 5 minutes prior to use.

The test samples were then allowed to pass through the column. The flow was adjusted by controlling globe valves on the discharge side of the column. Sufficient back pressure was maintained to prevent $CO_2$ from coming out of solution.

At the beginning of each run, raw water temperature, pH and total alkalinity was recorded. Raw water samples were collected for later analysis of sodium and ammonia. During the run, effluent water pH, FMA (free mineral acidity), alkalinity, column pressure drop and resin expansion were recorded at 15 minute intervals. Samples were saved for later analysis of sodium and ammonium. Testing was terminated when the effluent alkalinity exceeded 10% of the influent.

Prior to the next run the column was backwashed, regenerated and rinsed. Tests 1, 3, 5 and 6 were conducted in the 10' high column. Tests 2 and 4 were conducted in the 6' high column. Testing was performed in the following sequence:

TABLE III

| Testing Sequence | |
|---|---|
| 6' Column Tests | 10' Column Tests |
| 2 | 1 |
| 4 | 3 |
| | 6 |
| | 5 |

Note:
The 3 runs of each test were performed sequentially.

For Tests 1 to 4 the regenerant was added through a tap in the column which was located about 6" above the resin bed. In Tests 5 and 6, the regenerant was introduced through the top of the 10' column. This was about 3½' from the top of the regenerated bed.

The pH was recorded by a Sargent Welch Model TM RB meter with an on-line electrode.

Alkalinity and free mineral (FM) acidity measurements were accomplished by titration with 0.02N, NaOH or HCl to the methyl orange (M.O.) endpoint. These measurements were performed directly after the sample was taken.

Sodium analysis was performed on a Varian Model AA-775 atomic absorption spectrophotometer. Test specifications are as given in Analytical Methods For Flame Spectroscopy, Varian Techtron Pty., Ltd., June, 1978. Sodium is reported as total sodium in mg/l as $CaCO_3$, which also includes the contribution of sodium alkalinity.

Ammonia was measured by the Nessler reagent method, utilizing a Bausch & Lomb Model 20 spectrophotometer at a wave length of 460 nm. The Nessler reagent was prepared as specified in *Standard Methods*, Fourth Edition. To the 50 ml tests samples and a blank, 2 drops of sodium potassium tartrate and 1 ml of Nessler reagent was added. The test samples were then allowed to sit for 20 minutes before absorption readings were taken. Ammonia concentrations were determined from a standard absorption vs. concentration graph. Ammonia is reported as total ammonia in mg/l as $CaCO_3$, which also includes the contribution of ammonium alkalinity.

Pressure drops (symbolized at "OP" in Table IV) were measured by flooded mercury manometer with taps at 1' and 5' from the column base. Pressure readings were converted to psig and extrapolated over the total bed height (including expansion).

Tape measures were fixed to the outside of the columns to record bed heights and resulting resin expansion as inches bed increase.

All flow measurements were taken from calibrated rotameters. Separate meters were used for sample and rinse water flows, regenerate flows, and backwash flows. The average flow for each run was determined by the drawdown levels in the sample tanks at the end of the run.

Utilizing the apparatus described, Test #1, Run #1 was conducted under the following process conditions and raw water data:

Test Series #1, Run #1; Flowrate 6.2 gpm/ft$^2$; Bed Depth 2.67 ft.; Temperature 18.5° C.; Wastewater Analysis; pH 8.2; Ammonia, Sodium, Total Alkalinity (methyl orange) as mg/l as $CaCO_3$: 19; 1093, 724.

The results are listed below in Table IV:

TABLE IV

| Time from Start | pH | M.O. Alk. mg/l CaCO$_3$ | FM Acidity mg/l CaCO$_3$ | Na$^+$ mg/l CaCO$_3$ | NH$_4^+$ mg/l | DP (PSI) | Inches Bed Increase |
|---|---|---|---|---|---|---|---|
| 15 min. | 2.4 | — | 191 | 163 | .64 | 2.7 | 0.1 |
| 30 min. | 2.8 | — | 82 | 272 | 1.0 | 3.2 | 0.4 |
| 45 min. | 3.0 | — | 54 | 304 | 1.1 | 3.5 | 0.6 |
| 60 min. | 3.0 | — | 45 | 324 | 1.2 | 3.5 | 0.8 |
| 75 min. | 3.0 | — | 36 | 335 | 1.3 | 3.5 | 1.0 |
| 90 min. | 3.2 | — | 31 | 338 | — | 3.9 | 1.3 |
| 105 min. | 3.2 | — | 25 | 328 | 1.1 | 4.3 | 1.5 |
| 120 min. | 3.2 | — | 26 | 335 | — | 4.2 | 1.9 |
| 135 min. | 3.4 | — | 18 | 337 | 1.1 | 4.5 | 2.0 |
| 150 min. | 4.0 | — | 5 | 353 | — | 4.4 | 2.4 |
| 165 min. | 4.9 | 30 | — | 387 | 1.2 | 4.8 | 2.6 |
| 180 min. | — | 74 | — | 434 | 1.3 | 4.8 | 2.9 |

Two more runs (Runs #2 and #3) were conducted for Test #1, and the average data of the three runs is given in Table VI. Tests 2–6 (each consisting of three separate runs) were conducted in the same general manner with average data of the six tests shown also in Table IV.

SUMMARY OF RESULTS

Operating conditions for the various tests are included in following Table V showing the actual service data of bed depth, bed volume and resin loading and regeneration data including backwash flow, regeneration flow, dilute HCl wash, displacement rinse, final rinse flow, and respective rinse of each of the flow treatments. The listed data for Table VI is the average of 3 runs.

TABLE V

| | Test # | | | | | |
|---|---|---|---|---|---|---|
| | 1 | 2 | 3 | 4 | 5 | 6 |
| Bed Depth (ft) | 2.7 | 2.7 | 2.7 | 2.8 | 6.8 | 6.2 |

TABLE V-continued

| | Test # | | | | | |
|---|---|---|---|---|---|---|
| | 1 | 2 | 3 | 4 | 5 | 6 |
| Bed Volume (ft$^3$) | 0.24 | 0.24 | 0.24 | 0.24 | 0.59 | 0.54 |
| Loading | | | | | | |
| (gpm/ft$^2$) | 6.0 | 6.1 | 5.6 | 5.7 | 8.2 | 11.2 |
| (gpm/ft$^3$) | 2.2 | 2.3 | 2.1 | 2.0 | 1.2 | 1.8 |
| Backwash* Flow | | | | | | |
| (gpm/ft$^2$) | 5.0 | 5.0 | 5.0 | 5.0 | 5.0 | 5.0 |
| Time (min.) | 5.0 | 5.0 | 5.0 | 5.0 | 5.0 | 5.0 |
| Regenerent Flow (gpm/ft$^2$) | 1.4 | 1.4 | 1.4 | 1.4 | 1.4 | 1.4 |
| (4% HCl) Vol. (gal./ft$^3$) | 6.9 | 6.9 | 6.9 | 6.9 | 6.9 | 6.9 |
| Displacement Rinse | | | | | | |
| Flow (gpm/ft$^2$) | 1.0 | 1.0 | 1.0 | 1.0 | 1.0 | 1.0 |
| Time (min.) | 15.0 | 15.0 | 15.0 | 15.0 | 15.0 | 15.0 |
| Final Rinse Flow | | | | | | |
| (gpm/ft$^2$) | 1.5 | 1.5 | 1.5 | 1.5 | 1.5 | 1.5 |
| Time (min.) | 30.0 | 30.0 | 30.0 | 30.0 | 30.0 | 30.0 |

*In order to break up clumps of resin, the backwash flow was surged and extended for some runs.

Following Table VI contains the average results from each test. Capacities were calculated from the alkalinity breakthrough curves, up to the 10% breakpoint, by conventional techniques.

TABLE VI

| | Test # | | | | | |
|---|---|---|---|---|---|---|
| | 1 | 2 | 3 | 4 | 5 | 6 |
| Capacity (kilograins/ft$^3$) | 17.6 | 20.1 | 21.6 | 23.8 | 35.4 | 28.0 |
| Temp. °C. | 18.5 | 18.5 | 18.0 | 17.0 | 20.0 | 18.7 |

| (wastewater) | | | | | | |
|---|---|---|---|---|---|---|
| $^a$Water Analysis (mg/l as CaCO$_3$) | | | | | | |
| Alkalinity | 726.0 | 823.0 | 964.0 | 1099.0 | 1055.0 | 1025.0 |
| *Sodium | 1109.0 | 1084.0 | 1050.0 | 1444.0 | 1227.0 | 1379.0 |
| *Ammonia | 19.0 | 145.0 | 276.0 | 391.0 | 305.00 | 287.0 |
| Average Effluent Water Data (mg/l as CaCO$_3$) | | | | | | |
| *Sodium | 334.0 | 309.0 | 287.0 | 393.0 | 340.0 | 405.0 |
| *Ammonia | 3.1 | 27.0 | 46.0 | 57.0 | 69.0 | 61.0 |
| Average Percent Removal | | | | | | |
| *Sodium | 70.0 | 71.0 | 73.0 | 73.0 | 72.0 | 71.0 |
| *Ammonia | 84.0 | 81.0 | 83.0 | 85.0 | 77.0 | 79.0 |
| Run Length (min) | 190.0 | 188.0 | 184.0 | 179.0 | 458.0 | 240.0 |

*Represents total ion value including alkalinity
$^a$Inlet Water

As is seen, an overall sodium reduction of approximately 72% was measured uniformly for all tests. Ammonia removal averaged 83% with the shallow bed (Tests 1 to 4) and 78% with the deeper beds (Tests 5 and 6). The higher ammonia leakage in the deeper bed tests is probably due to incomplete regeneration.

A gradual increase in sodium leakage was observed for all the tests. This can be associated with decreasing FMA and increasing alkalinity leakage in the effluent stream. Ammonia leakage followed the same increasing pattern but was removed to a higher degree. Apparently, this resin has somewhat greater affinity for ammonia. Those runs which started with lower effluent FMA leakage generally had higher overall sodium and ammonia leakage.

Capacities

Reviewing Table VI, good repeatability in capacity was obtained in Tests 1 to 3. The lower degrees of repeatability obtained in Tests 4, 5 and 6 correlate directly with decreasing regenerent dosage. The higher capacity values for Tests 4, 5 and 6 were expected with increased regenerate dosages.

What is claimed is:

1. A process for reducing sodium and ammonium alkalinity of wastewater comprising the step of contracting said wastewater, possessing a sodium alkalinity/ammonium alkalinity greater than 1.0, and a hardness/alkalinity ratio less than 1.0, with a weak acid cation exchange resin, in hydrogen ion form, and continuing said contacting for a time sufficient to reduce the sum of said resulting sodium alkalinity and said ammonium alkalinity to about 10 mg./l as $CaCO_3$ or less.

2. The process of claim 1 wherein said sodium alkalinity is reduced by about 70%.

3. The process of claim 1 wherein said ammonium alkalinity is reduced by about 80%.

4. The process of claim 1 wherein said resin is an acrylic acid-divinylbenzene crosslinked copolymer.

5. The process of claim 1 wherein said wastewater is initially biologically treated and filtered to reduce the amount of organic materials present.

6. The process of claim 1 wherein said resulting wastewater is sufficient for use as makeup cooling water in an industrial process.

7. The process of claim 1 wherein the resulting ammonium alkalinity is about 3 mg./l as $CaCO_3$ or less.

8. The process of claim 1 wherein said treated wastewater further contains about 1000 ppm or less total dissolved solids.

9. A process for reducing sodium and ammonium alkalinity in biologically treated and filtered wastewater comprising the step of contacting said wastewater, containing a sodium alkalinity/ammonium alkalinity ratio greater than 1.0 and a hardness/total alkalinity ratio less than 1.0, with a weak acid cation exchange resin in hydrogen ion form, and continuing said contacting for a time sufficient to reduce the combined sodium and ammonium alkalinity to about 10 mg/l as $CaCO_3$, or less, and the ammonium alkalinity to about 3 mg/l as $CaCO_3$ or less.

* * * * *